United States Patent
Park (10) Patent No.: US 9,628,169 B2
(45) Date of Patent: Apr. 18, 2017

(54) AUTOMATIC POSITIONING ANTENNA SYSTEM FOR USE IN MULTI-SATELLITE RECEPTION, AND METHOD FOR TRACKING SATELLITES

(75) Inventor: Chan Goo Park, Daejeon (KR)

(73) Assignee: WIWORLD CO., LTD., Deajeon (KR)

( * ) Notice: Subject to any disclaimer, the term of this patent is extended or adjusted under 35 U.S.C. 154(b) by 415 days.

(21) Appl. No.: 14/356,088

(22) PCT Filed: Nov. 8, 2011

(86) PCT No.: PCT/KR2011/008441
§ 371 (c)(1),
(2), (4) Date: May 2, 2014

(87) PCT Pub. No.: WO2013/065890
PCT Pub. Date: May 10, 2013

(65) Prior Publication Data
US 2014/0315483 A1    Oct. 23, 2014

(30) Foreign Application Priority Data

Nov. 4, 2011   (KR) .................. 10-2011-0114390

(51) Int. Cl.
*H01Q 3/00* (2006.01)
*H04B 7/185* (2006.01)
(Continued)

(52) U.S. Cl.
CPC ......... *H04B 7/18523* (2013.01); *H01Q 1/288* (2013.01); *H01Q 21/28* (2013.01); *H04B 1/16* (2013.01)

(58) Field of Classification Search
CPC .......... H01Q 3/00; H01Q 1/288; H01Q 21/28; H04B 1/16; H04B 7/18523
(Continued)

(56) References Cited

U.S. PATENT DOCUMENTS

2007/0080860 A1* 4/2007 Norin ................. H01Q 3/08
                                                            342/359
2009/0224988 A1* 9/2009 Park ................... H01Q 1/1257
                                                            343/703
(Continued)

FOREIGN PATENT DOCUMENTS

KR   1020050041243   5/2005
KR   1020080056543   6/2008
(Continued)

OTHER PUBLICATIONS

International Search Report dated Nov. 1, 2012 for International Application No. PCT/KR2011/008441.

*Primary Examiner* — Harry Liu
(74) *Attorney, Agent, or Firm* — Susan Paik, Esq.

(57) ABSTRACT

The present invention relates to an automatic positioning antenna system for receiving multiple satellite signals and a method for tracking satellites to track positions of satellites through a satellite tracking LNB installed separately from a broadcast LNB, recognize the current position through information on tracked satellites and control an antenna to be oriented to the position of a target satellite to quickly receive satellite broadcast signals. The system includes an antenna unit having an antenna to which a broadcast LNB and a satellite tracking LNB receiving satellite signals for satellite tracking are connected, a switching unit for selecting the broadcast LNB or the satellite tracking LNB, a control unit for analyzing signals received through the satellite tracking LNB and controlling the antenna unit to be oriented to a target satellite using tracked satellite information; and a drive unit for moving the antenna unit under the control of the control unit.

8 Claims, 8 Drawing Sheets

(51) Int. Cl.
    *H01Q 1/28*    (2006.01)
    *H01Q 21/28*   (2006.01)
    *H04B 1/16*    (2006.01)

(58) Field of Classification Search
    USPC .......................................................... 342/359
    See application file for complete search history.

(56) References Cited

U.S. PATENT DOCUMENTS

| | | | | |
|---|---|---|---|---|
| 2010/0201589 A1* | 8/2010 | Hellberg | ................ | H01Q 1/288 |
| | | | | 343/760 |
| 2011/0012801 A1* | 1/2011 | Monte | .................... | H01Q 1/288 |
| | | | | 343/762 |
| 2011/0085626 A1* | 4/2011 | Busson | .................... | H04B 1/18 |
| | | | | 375/346 |
| 2011/0267255 A1* | 11/2011 | Locatori | ................. | H01Q 1/18 |
| | | | | 343/872 |

FOREIGN PATENT DOCUMENTS

| | | |
|---|---|---|
| KR | 1020090092629 | 9/2009 |
| KR | 1020110068702 | 6/2011 |

* cited by examiner

AUTOMATIC POSITIONING ANTENNA SYSTEM FOR USE IN MULTI-SATELLITE RECEPTION, AND METHOD FOR TRACKING SATELLITES

CROSS-REFERENCE TO RELATED APPLICATIONS

This application is a U.S. National Stage of International Application No. PCT/KR2011/008441, filed Nov. 8, 2011, which itself claims priority from Korean Patent Application No. 10-2011-0114390.

TECHNICAL FIELD

The present invention relates to an automatic positioning antenna system for use in multi-satellite reception and a method for tracking satellites and, more particularly, to an automatic positioning antenna system for use in multi-satellite reception and a method for tracking satellites to track the positions of satellites through a satellite tracking LNB (low noise block down converter) installed separately from a broadcast LNB, recognize the current position through tracked satellite information and control an antenna to be oriented to a target satellite so as to quickly receive satellite broadcast signals.

BACKGROUND ART

Many geostationary orbit satellites are closely positioned, for example, at intervals of about two degrees, and currently operated. Accordingly, it takes a long time to track a target satellite or tracking accuracy is decreased due to signal interference between satellites.

In a conventional multi-satellite reception antenna (including fixed and automatic positioning antennas), multiple LNBs track satellites and receive signals. In addition, the current position of the antenna is calculated using GPS signals and skew angles of the LNBs are changed based on the current position. Here, when the antenna is not arranged in the horizontal direction, a value for initial satellite tracking has an error corresponding to a tilting degree of the antenna since tracking is performed using GPS signal information.

In addition, a conventional tracking algorithm using GPS values simply employs a sequential tracking method and needs to synchronize an antenna and GPS signals, and thus initial satellite tracking takes 10 minutes or longer.

Figure 1:
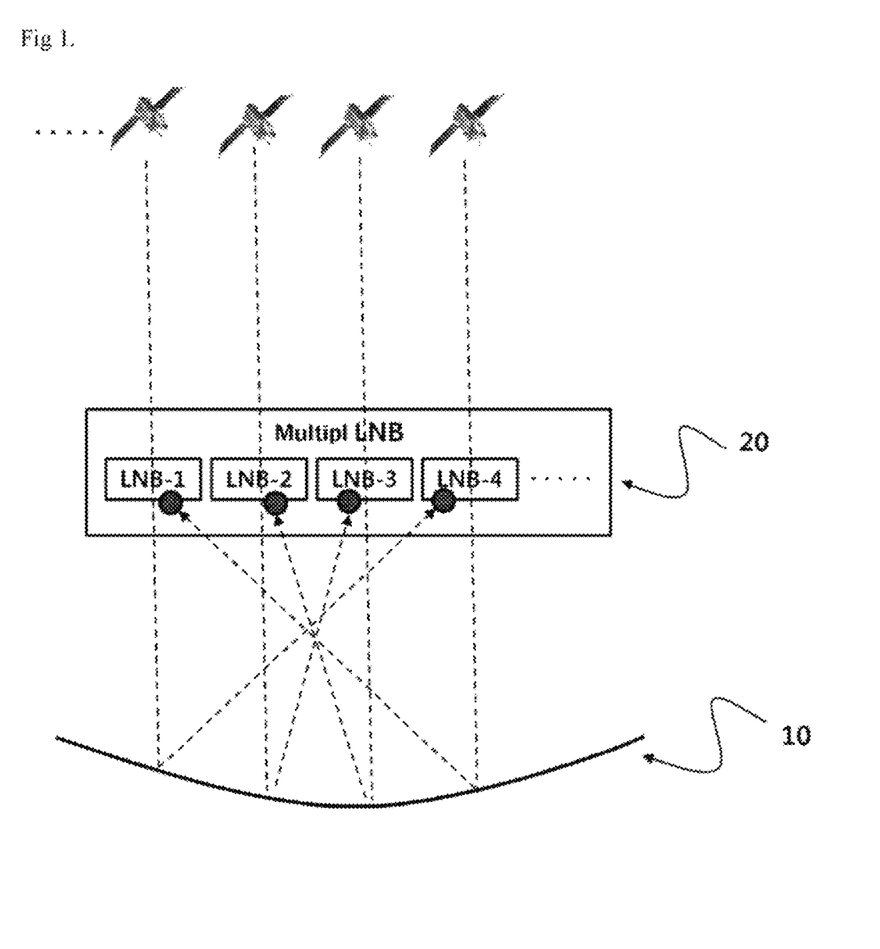
FIG. 1 illustrates installation of a conventional multi-satellite reception antenna.

FIG. 1 illustrates installation of a conventional multi-satellite reception antenna.

Referring to FIG. 1, an antenna 10 is equipped with multiple LNBs 20 for receiving satellite signals from a plurality of satellites. The multiple LNBs 20 track satellites and receive satellite broadcast signals, simultaneously. Since the multiple LNBs of the conventional multi-satellite reception antenna execute both the function of tracking satellites and the function of receiving satellite broadcast signals, satellite tracking time increases and an error caused by tilting of the antenna is generated, as described above.

SUMMARY OF THE INVENTION

Therefore, the present invention has been made in view of the above problems of the conventional multi-satellite reception antenna, and it is an object of the present invention to provide an automatic positioning antenna system for use in multi-satellite reception and a method for tracking satellites to track positions of satellites using a satellite tracking LNB which is provided to the antenna system, separately from an LNB for receiving broadcast signals, and to control antenna direction based on tracked satellite information to quickly receive satellite broadcast signals.

Technical Solution

In accordance with an aspect of the present invention, the above and other objects can be accomplished by the provision of an automatic positioning antenna system for receiving multiple satellite signals, including: an antenna unit having an antenna to which a broadcast LNB receiving satellite broadcast signals and a satellite tracking LNB receiving satellite signals for satellite tracking are connected; a switching unit for selecting the broadcast LNB or the satellite tracking LNB of the antenna unit; a control unit for analyzing satellite signals received through the satellite tracking LNB to track satellites and controlling the antenna unit to be oriented to a target satellite using tracked satellite information; and a drive unit for moving the antenna unit under the control of the control unit.

The control unit may include: a signal controller for analyzing satellite signals received through the satellite tracking LNB to detect satellite information and current position information and calculating the direction of the antenna unit facing a target satellite based on the current position information; and a drive controller for transmitting an antenna control command to the drive unit according to the direction of the antenna unit facing the target satellite, calculated by the signal controller.

The signal controller may include a switching controller for controlling switching operation of the switching unit, a satellite tracking unit for tracking at least two satellites through satellite signals received through the satellite tracking LNB to detect the orbits, elevation angles and azimuth angles of tracked satellites, a current position calculator for calculating current latitude and longitude information using information on the at least two satellites, detected by the satellite tracking unit, an LNB skew angle calculator for calculating the skew angle of an LNB using the current position information calculated through the current position calculator, and a target satellite peaking unit for comparing and analyzing levels of received satellite signals such that the antenna unit points in a direction in which satellite signals have highest levels.

The drive controller may include a driver for controlling operation of the drive unit such that the antenna unit is oriented to a direction in which satellite signals have highest levels according to a value calculated through the satellite tracking unit, the LNB skew angle calculator or the target satellite peaking unit.

The satellite tracking LNB may be an LNB for circularly polarized waves and the satellite tracking LNB may be connected to the antenna through a satellite tracking LNB bracket and provided at one side of the broadcast LNB.

The broadcast LNB may include one of a SWIM System LNB, Starchoice System LNB, DirecTV System LNB and Dish Network System LNB and the broadcast LNB may be connected to a linearly polarized wave-to-circularly polarized wave converter including a phase shifter and a signal combiner to convert a linearly polarized wave into a circularly polarized wave.

In accordance with another aspect of the present invention, there is provided a method for tracking satellites to receive satellite signals, including: tracking at least two satellites through satellite signals received through a satellite tracking LNB included in an antenna unit and detecting information on the orbits, elevation angles and azimuth angles of tracked satellites; calculating the current latitude and longitude through the detected information; and controlling the antenna unit to be oriented to a target satellite using the calculated current latitude and longitude.

The controlling of the antenna unit may include calculating the skew angle of an LNB included in the antenna unit using the calculated current latitude and longitude and outputting a control signal for changing the skew angle of the LNB based on the calculated LNB skew angle to move the LNB.

The method may further include activating a broadcast LNB included in the antenna unit to receive satellite broadcast signals after movement of the LNB based on the LNB skew angle.

The method may further include measuring the level of a satellite broadcast signal when the satellite broadcast signal is received through the broadcast LNB and controlling the antenna unit to point in a direction in which the satellite broadcast signal has a highest level.

Advantageous Effects

The automatic positioning antenna system for use in multi-satellite reception according to the present invention can rapidly track positions of satellites through the satellite tracking LNB installed separately from the broadcast LNB.

Particularly, the present invention smoothly receives satellite broadcast signals by calculating the current position using information on at least two satellites without an additional component such as a GPS and locating the antenna in the direction of a broadcast satellite using the calculated current position. Accordingly, since the current position coordinates can be detected and a tilting degree of the antenna can be recognized without a tilt sensor by analyzing the information on the at least two satellites, antenna position can be corrected. Furthermore, the LNB can be located in a desired direction in which satellite signals are received more rapidly and accurately using the current position and information such as azimuth angles, elevation angles and skew angles of all satellites, which can be previously input to the antenna system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

A preferred embodiment of the present invention will now be described in detail with reference to the attached drawings.

Figure 2:
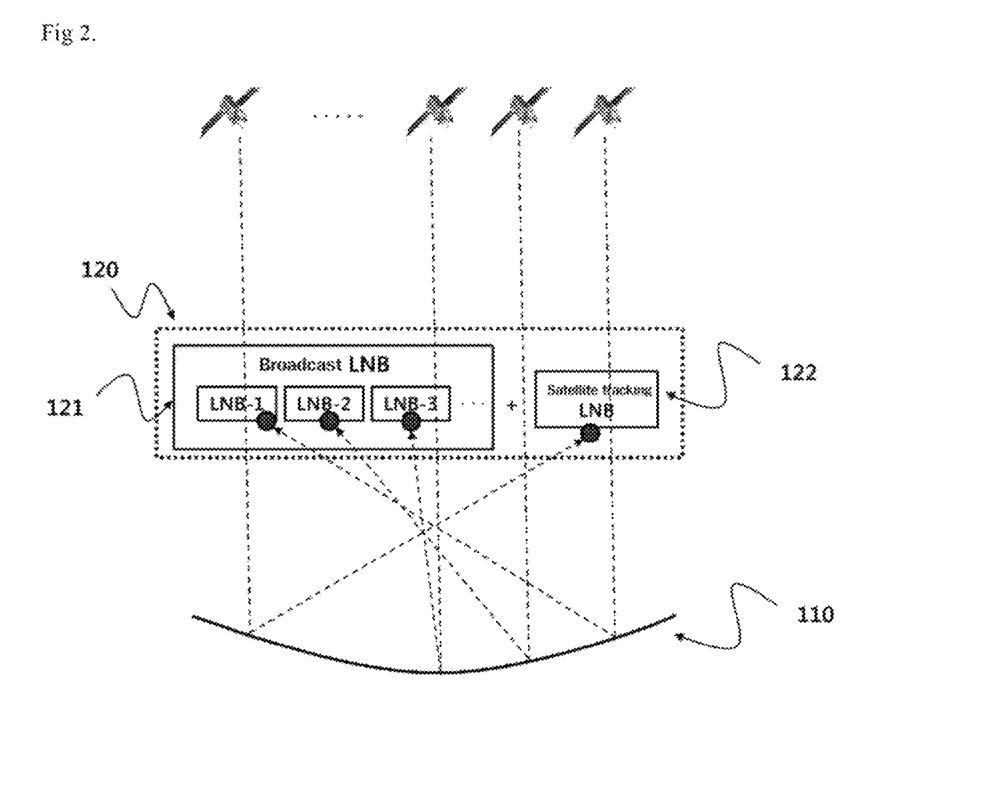
FIG. 2 illustrates installation of an automatic positioning antenna system for use in multi-satellite reception according to an embodiment of the present invention.

FIG. 2 illustrates installation of an automatic positioning antenna system for use in multi-satellite reception according to an embodiment of the present invention.

As shown in FIG. 2, the automatic positioning antenna system for use in multi-satellite reception according to an embodiment of the present invention includes a satellite tracking LNB 122 and a broadcast LNB 121, which are provided to an antenna 110.

The broadcast LNB 121 corresponds to multiple LNBs for receiving satellite broadcast signals, which include LNBs LNB-1, LNB-2, LNB-3, . . . , whereas the satellite tracking LNB 122 is an LNB for initial satellite position tracking. The satellite tracking LNB 122 is provided separately from the broadcast LNB 121 such that satellite tracking operation is separated from satellite broadcast reception operation, thereby rapidly tracking positions of satellites during initial antenna system operation.

Figure 3:
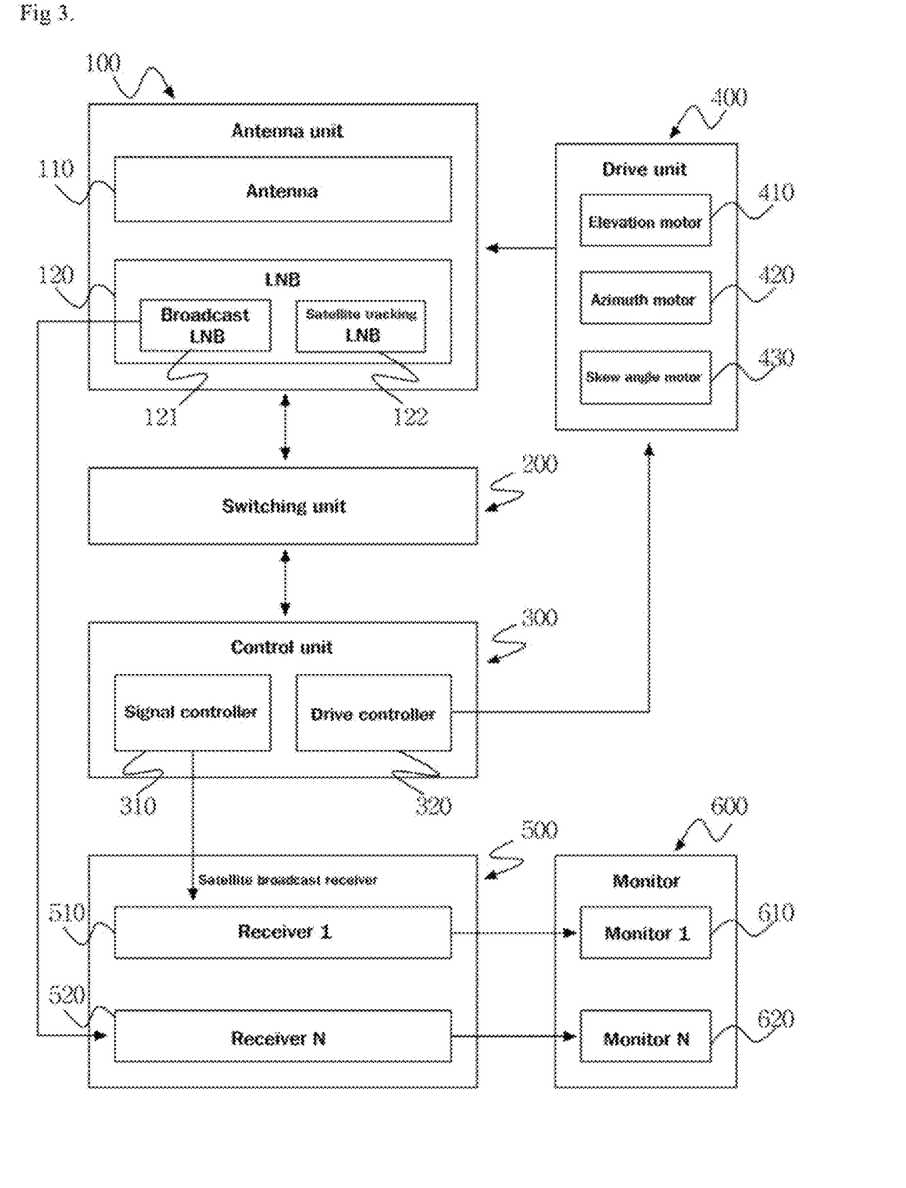
FIG. 3 is a block diagram of the automatic positioning antenna system for use in multi-satellite reception according to an embodiment of the present invention.

FIG. 3 is a block diagram of the automatic positioning antenna system for use in multi-satellite reception according to an embodiment of the present invention.

As shown in FIG. 3, the automatic positioning antenna system for use in multi-satellite reception according to an embodiment of the present invention includes an antenna unit 100 for receiving satellite signals, a switching unit 200 for selecting a satellite signal reception path of the antenna unit 100, a control unit 300 for analyzing a satellite signal received through the antenna unit 100 to track the position of a satellite, a drive unit 400 for moving the antenna unit 100 under the control of the control unit 300, a satellite broadcast receiver 500 for receiving satellite broadcast signals received through the antenna 100, and a monitor 600 for outputting satellite broadcast signals received through the satellite broadcast receiver 500.

The antenna unit 100 includes the antenna 110 for receiving satellite signals and an LNB 120 including the broadcast LNB 121 for receiving satellite broadcast signals from among satellite signals received through the antenna 110 and the satellite tracking LNB 122 for receiving satellite signals through satellite tracking. The LNB 120 refers to a frequency converter which down-converts a satellite frequency to a set-top box frequency in the satellite broadcast receiver 500 and is additionally provided to a receiver of a satellite reception parabolic antenna, that is, a feed-horn provided to a point upon which electromagnetic waves reflected from a parabolic plate are concentrated. The LNB 120 receives C-band (4 to 8) and Ku-band (12 to 18) frequencies transmitted from satellites and converts the frequencies to frequencies (hundreds to 2) which can be processed by a set-top box. The LNB 120 is configured in the form of a combination of a mixer and a low noise amplifier (LNA) due to the characteristics thereof. The LNA increases a weak signal level while minimizing noise when a high frequency received from a satellite passes therethrough and the mixer down-converts the frequency.

The switching unit 200 switches to select the broadcast LNB 121 or the satellite tracking LNB 122 included in the antenna unit 100 under the control of the control unit 300. The switching unit 200 executes a switching function such that a satellite signal from the satellite tracking LNB 122 is input to the control unit 300 during initial satellite tracking and a satellite signal from the broadcast LNB 121 is input to the control unit 300 after satellite tracking. In an embodiment of the present invention, the switching unit 200 is composed of a digital satellite equipment control switch corresponding to an automatic satellite selector.

The control unit 300 controls the switching unit 200 to receive a satellite signal through the satellite tracking LNB 122, analyzes the satellite signal to track a satellite and recognizes the current position through tracked satellite information to control the antenna unit 100. The control unit 300 includes a signal controller 310 and a drive controller 320. The signal controller 310 determines whether the received satellite signal is a desired satellite signal and determines a maximum signal level such that the antenna unit 100 is oriented to the corresponding satellite. In addition, the signal controller 310 analyzes information on at least two satellites, received through the satellite tracking LNB 122, to calculate the current latitude and longitude. The drive controller 320 controls movement of the antenna unit 100 by transmitting a drive control signal to the drive unit 400 such that the antenna unit 100 is oriented to the satellite from which the antenna unit 100 attempts to receive a satellite signal. The drive controller 320 includes a driver for operating the drive unit 400 under the control of the signal controller 310.

The drive unit 400 moves the antenna unit 100 under the control of the drive controller 320 included in the control unit 300. The drive unit 400 is provided with various motors and components, which include an elevation motor 410 for changing the elevation angle of the antenna 110, an azimuth motor 420 for changing the azimuth angle of the antenna 110 and a skew angle motor 430 for changing the skew angle of the LNB 120.

The satellite broadcast receiver 500 receives a satellite signal which is received through the broadcast LNB 121 after the switching unit 200 switches to the broadcast LNB 121 through the control unit 300 and converts the satellite signal into a broadcast signal. The satellite broadcast receiver 500 includes a first receiver 510 for receiving a satellite signal, received through the broadcast LNB 121 and output through the signal controller 310 of the control unit 300, and a receiver N 520 for receiving a satellite signal directly transmitted from the broadcast LNB 121. That is, the first receiver 510 receives a satellite signal which is input to the signal controller 310 of the control unit 300 for satellite tracking and then output from the signal controller 310, and the receiver N 520 corresponds to the multi-output LNB 120. If the LNB 120 is a 4-output LNB, then the satellite broadcast receiver 500 can include four receivers (including a receiver receiving a signal output via the signal controller).

The monitor 600 is a display for outputting broadcast signals output from the satellite broadcast receiver 500 and includes a first monitor 610 corresponding to the first receiver 510 and a monitor N 620 corresponding to the receiver N 520.

The aforementioned automatic positioning antenna system for use in multi-satellite reception according to the present invention includes the separate satellite tracking LNB 122 in addition to the broadcast LNB 121, distinguished from the conventional satellite tracking antenna in which multiple LNBs simultaneously execute satellite tracking and signal reception functions, to thereby reduce time taken to track a satellite and enable accurate satellite tracking.

A description will be given of the signal controller included in the control unit for tracking the position of a satellite to control operation of the antenna unit.

Figure 4:
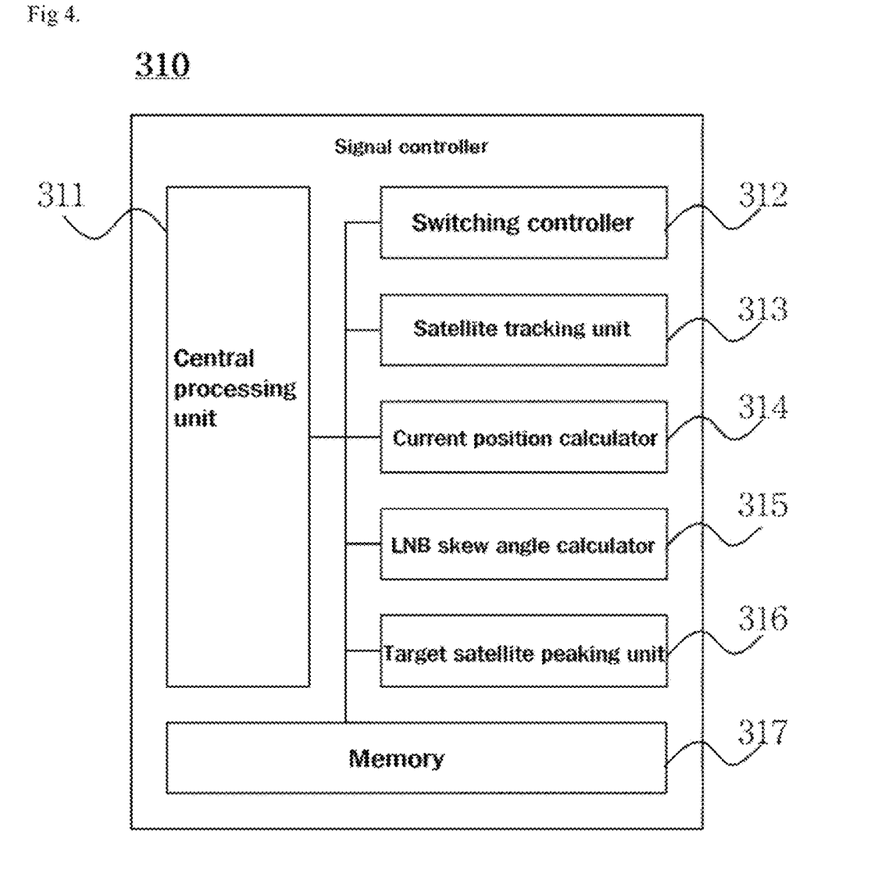
FIG. 4 is a block diagram of a signal controller included in a control unit of the automatic positioning antenna system for use in multi-satellite reception according to an embodiment of the present invention.

FIG. 4 is a block diagram of the signal controller included in the control unit according to an embodiment of the present invention.

As shown in FIG. 4, the signal controller 310 includes a switching controller 312 for controlling the switching unit 200, a satellite tracking unit 313 for tracking satellites by analyzing satellite signals received through the satellite tracking LNB 122 during system operation, a current position calculator 314 for calculating the current position through tracked satellite information, an LNB skew angle calculator 315 for calculating the skew angle of the LNB 120 based on the calculated current position, a target satellite peaking unit 316 for continuously tracking the position of a target satellite during broadcast reception, a memory 317 storing data and a central processing unit 311 for controlling operations of the aforementioned components.

The switching controller 312 is a program module which controls switching operation of the switching unit 200, controls the switching unit 200 to select the satellite tracking LNB 122 during initial satellite tracking and to control the switching unit 200 to select the broadcast LNB 121 after satellite tracking.

The satellite tracking unit 313 is a program module which detects positions of satellites by analyzing satellite signals received through the satellite tracking LNB 122. The satellite tracking unit 313 tracks at least two satellites to detect information such as the orbits, elevation angles and azimuth angles of tracked satellites and stores the information in the memory 317.

The current position calculator 314 is a program module which calculates the current position based on the information detected through the satellite tracking unit 313. The current position calculator 314 calculates the current latitude and longitude based on the orbits, elevation angles and azimuth angles of the at least two satellites, detected through the satellite tracking unit 313, and stores the current latitude and longitude in the memory 317.

The LNB skew angle calculator 315 is a program module which calculates the skew angle of the LNB 120 based on the current position calculated by the current position calculator 314. The LNB skew angle calculated through the LNB skew angle calculator 315 is transmitted to the drive controller 320 under the control of the central processing unit 311.

The target satellite peaking unit 317 is a program module which measures the strength of a satellite broadcast signal when the satellite broadcast signal is received through the broadcast LNB 121 according to satellite tracking and controls the antenna unit 100 to point in a direction in which the satellite broadcast signal has maximum strength.

Values finally calculated through the satellite tracking unit 313, the LNB skew angle calculator 315 and the target satellite peaking unit 316 are transmitted to the driver of the drive controller 320 under the control of the central processing unit 311. The drive controller 320 controls operation of the drive unit 400 based on the values such that the antenna unit 100 can point in a direction in which a satellite signal has maximum strength.

A description will be given of a procedure of calculating the current position and the skew of the LNB through the signal controller having the aforementioned configuration.

Figure 5:
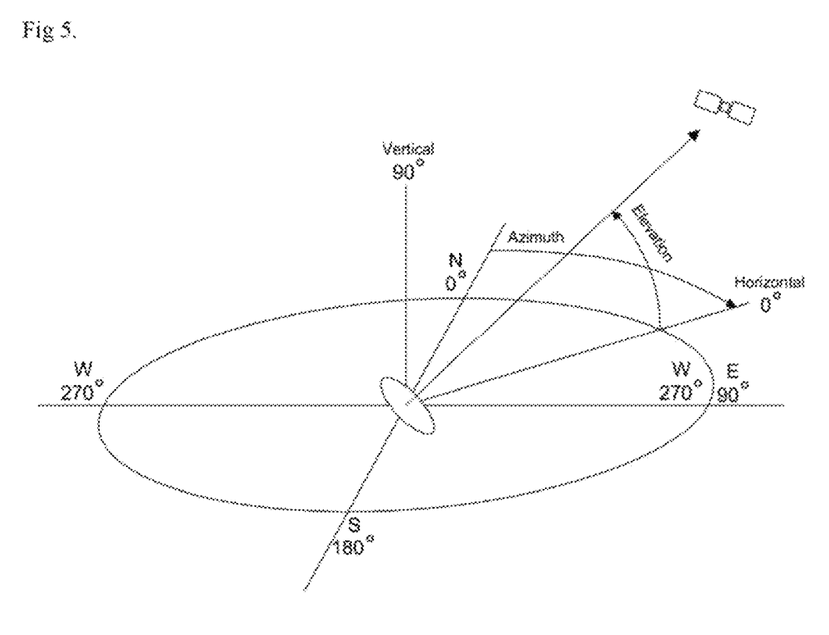
FIG. 5 illustrates the relationship between positions of a satellite and the automatic positioning antenna system for use in multi-satellite reception according to an embodiment of the present invention.

FIG. 5 illustrates the relationship between the positions of a satellite and the automatic positioning antenna system for use in multi-satellite reception according to an embodiment of the present invention.

As described above, the automatic positioning antenna system according to the present invention calculates the current position by detecting position information of at least two satellites and calculates the LNB skew angle of the antenna through the calculated current position.

In FIG. 5, when two satellites (satellite 1 and satellite 2) are initially tracked, variables with respect to the satellites and the current position are defined as follows.

$S_1$: longitude of satellite 1
$S_2$: longitude of satellite 2
N: longitude at the current position
L: latitude at the current position
$A_1$: azimuth angle of satellite 1 from the current position
$A_2$: azimuth angle of satellite 2 from the current position
$E_1$: elevation angle of satellite 1 from the current position
$E_2$: elevation angle of satellite 2 from the current position
Re: radius of the earth
r: distance between the center of the earth and a satellite (approximately 42,164 km)
X: $A_1-A_2$ (azimuth angle difference between two satellites)
Y: $E_1-E_2$ (elevation angle difference between two satellites)

$S_1$, $S_2$, $A_1$, $A_2$, $E_1$ and $E_2$ can be detected through satellite signals received through the satellite tracking LNB, Re and r are known values and X and Y can be determined by calculating a difference between the detected azimuth angles of the two satellites and a difference between the detected elevation angles of the two satellites. Variables that the present invention attempts to obtain are longitude N and latitude L. Longitude N and latitude L at the current position can be calculated since the azimuth angle difference X and elevation angle difference Y between the two satellites at the current position can be obtained.

The azimuth angles $A_1$ and $A_2$ of satellites 1 and 2 are calculated through Equation 1.

$$A_1 = \tan^{-1}\left[\frac{\tan|S_1-N|}{\sin(L)}\right]+180 \quad \text{[Equation 1]}$$
$$A_2 = \tan^{-1}\left[\frac{\tan|S_2-N|}{\sin(L)}\right]+180$$

Here, $A_1-A_2=X$ and X is a known value obtained through satellite information. Accordingly, $A_1-A_2$ can be arranged as represented by Equation 2.

$$A_1-A_2 = \tan^{-1}\left[\frac{\tan|S_1-N|}{\sin(L)}\right] - \tan^{-1}\left[\frac{\tan|S_2-N|}{\sin(L)}\right] = X \quad \text{[Equation 2]}$$

The elevation angles $E_1$ and $E_2$ of satellites 1 and 2 are calculated through Equation 3.

$$E_1 = \tan^{-1}\left[\frac{\cos|S_1-N|\cdot\cos(L)-\frac{R_e}{r}}{\sqrt{1-\cos^2|S_1-N|\cdot\cos^2(L)}}\right] \quad \text{[Equation 3]}$$

$$E_2 = \tan^{-1}\left[\frac{\cos|S_2-N|\cdot\cos(L)-\frac{R_e}{r}}{\sqrt{1-\cos^2|S_2-N|\cdot\cos^2(L)}}\right]$$

Here, since Re=6378.2 and r=42164, Re/r=0.1512. Accordingly, Equation 3 can be arranged as follows.

$$E_1 = \tan^{-1}\left[\frac{\cos|S_1-N|\cdot\cos(L)-0.1512}{\sqrt{1-\cos^2|S_1-N|\cdot\cos^2(L)}}\right] \quad \text{[Equation 4]}$$

$$E_2 = \tan^{-1}\left[\frac{\cos|S_2-N|\cdot\cos(L)-0.1512}{\sqrt{1-\cos^2|S_2-N|\cdot\cos^2(L)}}\right]$$

Here, $E_1-E_2=Y$ and Y is a known value obtained through information of the two satellites. Accordingly, $E_1-E_2$ can be arranged as represented by Equation 5.

$$E_1-E_2 = \tan^{-1}\left[\frac{\cos|S_1-N|\cdot\cos(L)-0.1512}{\sqrt{1-\cos^2|S_1-N|\cdot\cos^2(L)}}\right] - \quad \text{[Equation 5]}$$
$$\tan^{-1}\left[\frac{\cos|S_2-N|\cdot\cos(L)-0.1512}{\sqrt{1-\cos^2|S_2-N|\cdot\cos^2(L)}}\right]$$
$$= Y$$

Longitude N and latitude L at the current position are finally obtained through the aforementioned process. Since variables N and L are included in Equations 2 and 5 and the other variables can be known as described above, variables N and L corresponding to the longitude and latitude at the current position can be obtained by performing computation using Equations 2 and 5 as simultaneous quadratic equations.

The calculated longitude N and latitude L at the current position are used to calculate the skew angle of the LNB 120. The skew angle of the LNB 120 is calculated using a difference between the elevation angles of satellites 1 and 2 and a difference between the azimuth angles of satellites 1 and 2, viewed from the current position. Here, the difference between the elevation angles of satellites 1 and 2 and the difference between the azimuth angles of satellites 1 and 2 are known values obtained through information on the two satellites. The LNB skew angle is calculated through Equation 6.

$$LNB \text{ Skew Angle} = \tan^{-1}\left[\frac{E_2-E_1}{A_2-A_1}\right] \quad \text{[Equation 6]}$$

As described above, the present invention calculates the elevation angles and azimuth angles of at least two satellites at the current positions using the orbits, elevation angles and azimuth angles of the at least two satellites and calculates the LNB skew angle using the calculated elevation angles and azimuth angles at the current positions.

A description will be given of a procedure of tracking a satellite and receiving satellite broadcast signals through the automatic positioning antenna system configured as above.

Figure 6:
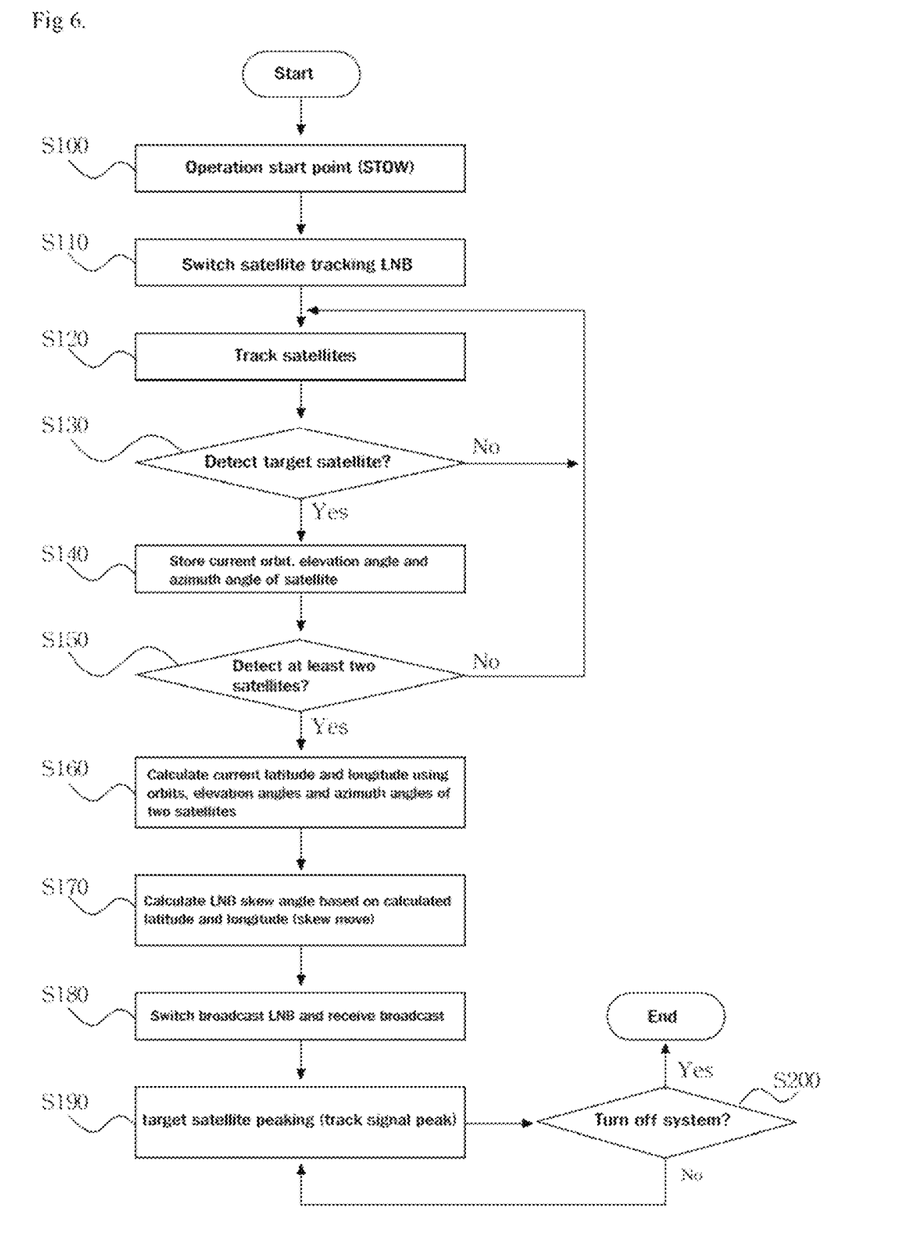
FIG. 6 is a flowchart illustrating a procedure of tracking a satellite through the automatic positioning antenna system for use in multi-satellite reception according to an embodiment of the present invention.

FIG. 6 is a flowchart illustrating a procedure of tracking a satellite through the multi-satellite reception auto-positioning antenna system according to an embodiment of the present invention.

When the antenna system is powered on, the antenna unit 100 moves to an operation start point (STOW) and waits for a signal in step S100.

When the antenna system is turned on, the switching unit 200 switches to select the satellite tracking LNB 122 under the control of the control unit 300 (S110) and a satellite signal transmitted from the satellite tracking LNB 122 is analyzed to track the position of a target satellite (S120).

Upon detection of the target satellite (S130), information on the orbit, elevation angle and azimuth angle of the detected satellite are stored in the memory 317 of the control unit 300 (S140). The process of detecting a target satellite and storing information on the detected satellite is repeated until the number of detected satellites becomes two or more (S150).

Upon detection of two or more satellites through the aforementioned process, the current latitude and longitude are calculated using the orbits, elevation angles and azimuth angles of the detected first and second satellites (S160).

Upon calculation of the current latitude and longitude, an LNB skew angle is calculated using the current latitude and longitude and the skew angle of the LNB 120 is changed through the driver unit 400 based on the calculated LNB skew angle (S170).

Upon change of the skew angle of the LNB 120 based on the calculated LNB skew angle, the control unit 300 controls the switching unit 200 to select the broadcast LNB 121 and thus the satellite broadcast receiver 500 receives a satellite broadcast signal received through the broadcast LNB 121 and outputs the satellite broadcast signal to the monitor 600 (S180).

While the satellite broadcast signal is received and output to the monitor 600, the control unit 300 tracks the peak of a satellite signal received from a target satellite and controls the antenna unit 100 to be oriented to the target satellite such that the antenna unit 100 performs peaking on satellite signals from the target satellite (S190).

The procedure of tracking satellites and receiving satellite signals is repeated until the system is turned off (S200).

As described above, the automatic positioning antenna system for use in multi-satellite reception according to the present invention tracks two or more target satellites through the satellite tracking LNB 122 and calculates the current longitude and latitude using the orbits, elevation angles and azimuth angles of the two or more tracked target satellites. The skew angle of the LNB 120 is calculated based on the calculated current longitude and latitude, the LNB 120 is moved based on the calculated LNB skew angle and satellite broadcast signals are received through the broadcast LNB 121 and output to the monitor 600. The antenna unit 100 is controlled to point toward the target satellites by measuring a satellite signal level and tracking the peak of the satellite signal level during the satellite broadcast reception process.

Figure 7:
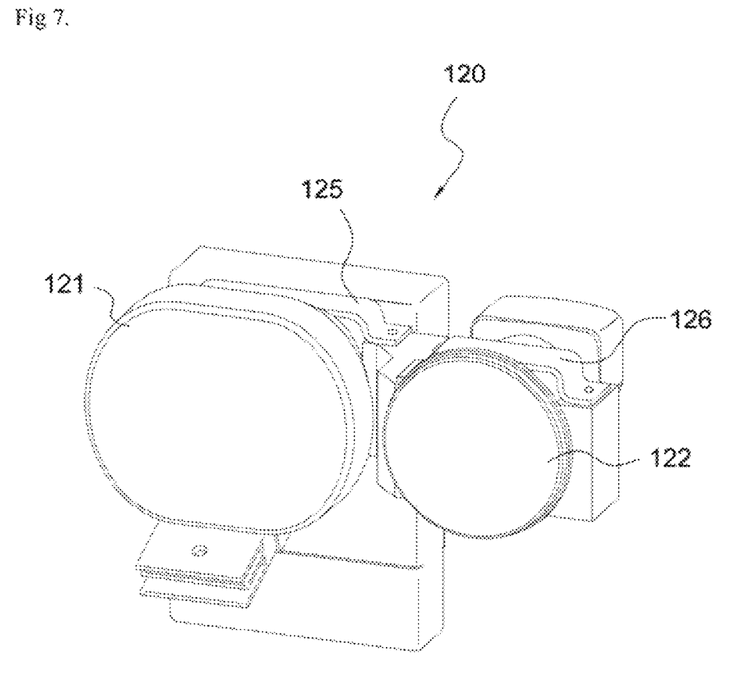
FIGS. 7 and 8 illustrate installation of LNBs of the automatic positioning antenna system for use in multi-satellite reception according to the present invention.
Figure 8:
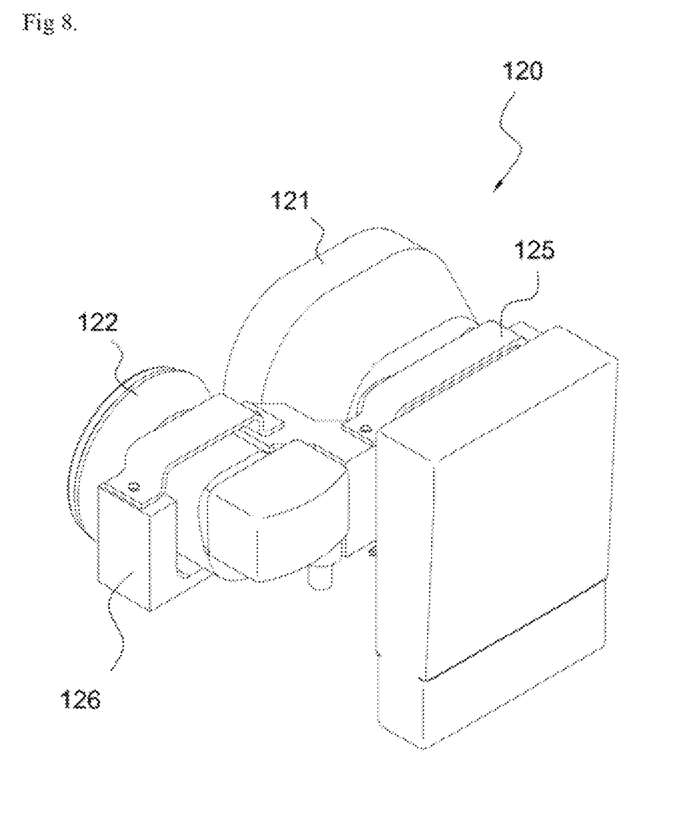

FIGS. 7 and 8 illustrate installation of the LNB of the automatic positioning antenna system for use in multi-satellite reception according to an embodiment of the present invention.

Referring to FIGS. 7 and 8, the automatic positioning antenna system for use in multi-satellite reception according to an embodiment of the present invention includes the satellite tracking LNB 122 which is additionally provided to the antenna 110, separately from the broadcast LNB 121, to track satellites through the satellite tracking LNB 122 without LNB skew angle change during initial satellite tracking. Here, the broadcast LNB 121 is attached to the antenna 110 through a broadcast LNB bracket 125 and the satellite tracking LNB 122 is mechanically installed at one side of the broadcast LNB 121 through a satellite tracking LNB bracket 126.

In an embodiment of the present invention, the broadcast LNB 121 may be implemented as a SWIM System LNB, Starchoice system LNB, DirecTV system LNB, Dish Network System LNB, etc. The SWIM system LNB is an LNB type used in the United States and Canada and Starchoice, DirecTV, Dish Network are service providers which provide satellite broadcast services in the United States and Canada. The broadcast LNB 121 shown in FIGS. 7 and 8 is an example of Starchoice System LNB.

In an embodiment of the present invention, the satellite tracking LNB 122 may be implemented as an LNB for receiving linearly polarized waves or circularly polarized waves according to environment to which the satellite tracking LNB 122 is applied. Since circularly polarized satellite signals are used in the United States and Canada, the satellite tracking LNB 122 is preferably implemented as a circularly polarized wave reception LNB. Particularly, while frequencies provided through circularly polarized waves are hardly changed in the United State and Canada, satellite information is frequently changed in case of linearly polarized signals and thus antenna configuration needs to be changed according to satellite information change. Accordingly, it is desirable that the satellite tracking LNB 122 is implemented as an LNB for circularly polarized waves.

In addition, the broadcast LNB 121 may be implemented as an LNB for receiving linearly polarized waves or circularly polarized waves according to environment to which the broadcast LNB 121 is applied. When the broadcast LNB 121 is configured in the form of a linearly polarized wave reception LNB, a linearly polarized wave-to-circularly polarized wave converter may be added thereto. For example, in the case of an LNB (for linearly polarized waves) used in Canada, only two of four outputs of the LNB are used. The remaining two outputs correspond to a horizontally polarized wave and a vertically polarized wave. Here, since a circularly polarized signal can be generated using a linearly polarized wave-to-circularly polarized wave converter including a 90° phase shifter and a signal combiner, a system which does not require an additional LNB for circularly polarized waves can be constructed.

As described above, the automatic positioning antenna system for use in multi-satellite reception according to the present invention can quickly track a target satellite through the satellite tracking LNB 122 installed separately from the broadcast LNB 121. In addition, the automatic positioning antenna system for use in multi-satellite reception according to the present invention can calculate the current position using information on two or more satellites and control the antenna to be oriented to a target broadcast satellite using the calculated current position to receive broadcast signals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An automatic positioning antenna system for receiving multiple satellite signals, comprising:
   an antenna unit having an antenna to which a broadcast LNB receiving satellite broadcast signals and a satellite tracking LNB receiving satellite signals for satellite tracking are connected;

a switching unit for selecting the broadcast LNB or the satellite tracking LNB of the antenna unit;

a control unit for analyzing satellite signals received through the satellite tracking LNB to track satellites and controlling the antenna unit to be oriented to a target satellite using tracked satellite information, wherein the switching unit selects the broadcast LNB to receive satellite broadcast signals when the antenna unit is controlled to be oriented to the target satellite; and a drive unit for moving the antenna unit under the control of the control unit.

2. The automatic positioning antenna system according to claim 1, wherein the control unit comprises:

a signal controller for analyzing satellite signals received through the satellite tracking LNB to detect satellite information and current position information and calculating the direction of the antenna unit facing a target satellite based on the current position information; and a drive controller for transmitting an antenna control command to the drive unit according to the direction of the antenna unit facing the target satellite, calculated by the signal controller.

3. The automatic positioning antenna system according to claim 2, wherein the signal controller comprises:

a switching controller for controlling switching operation of the switching unit;

a satellite tracking unit for tracking at least two satellites through satellite signals received through the satellite tracking LNB to detect the orbits, elevation angles and azimuth angles of tracked satellites;

a current position calculator for calculating current latitude and longitude information using information on the at least two satellites, detected by the satellite tracking unit;

an LNB skew angle calculator for calculating the skew angle of an LNB using the current position information calculated through the current position calculator; and a target satellite peaking unit for comparing and analyzing levels of received satellite signals such that the antenna unit points in a direction in which satellite signals have highest levels.

4. The automatic positioning antenna system according to claim 3, wherein the drive controller includes a driver for controlling operation of the drive unit such that the antenna unit is oriented to a direction in which satellite signals have highest levels according to a value calculated through the satellite tracking unit, the LNB skew angle calculator or the target satellite peaking unit.

5. The automatic positioning antenna system according to claim 1, wherein the satellite tracking LNB is an LNB for circularly polarized waves.

6. The automatic positioning antenna system according to claim 1, wherein the satellite tracking LNB is connected to the antenna through a satellite tracking LNB bracket and provided at one side of the broadcast LNB.

7. The automatic positioning antenna system according to claim 1, wherein the broadcast LNB includes one of a SWIM System LNB, Starchoice System LNB, DirecTV System LNB and Dish Network System LNB.

8. The automatic positioning antenna system according to claim 1, wherein the broadcast LNB is connected to a linearly polarized wave-to-circularly polarized wave converter including a phase shifter and a signal combiner to convert a linearly polarized wave into a circularly polarized wave.

* * * * *